(12) United States Patent
Furlanetto et al.

(10) Patent No.: US 11,995,535 B2
(45) Date of Patent: *May 28, 2024

(54) CROSS IN-DATABASE MACHINE LEARNING

(71) Applicant: SAP SE, Walldorf (DE)

(72) Inventors: Marco Antonio Carniel Furlanetto, Porto Alegre (BR); Alessandro Parolin, Sao Leopoldo (BR); Cristiano Ruschel Marques Dias, Porto Alegre (BR); Alejandro Salinger, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/213,071

(22) Filed: Jun. 22, 2023

(65) Prior Publication Data
US 2023/0334303 A1    Oct. 19, 2023

Related U.S. Application Data

(63) Continuation of application No. 17/964,490, filed on Oct. 12, 2022, now Pat. No. 11,755,896, which is a
(Continued)

(51) Int. Cl.
*G06N 5/04*        (2023.01)
*G06F 18/214*      (2023.01)
(Continued)

(52) U.S. Cl.
CPC ........... *G06N 3/063* (2013.01); *G06F 18/214* (2023.01); *G06F 18/24323* (2023.01);
(Continued)

(58) Field of Classification Search
None
See application file for complete search history.

(56) References Cited

U.S. PATENT DOCUMENTS 11,216,580 B1 * 1/2022  Holboke ............... G06F 18/214
11,494,672 B2 * 11/2022 Furlanetto .............. G06N 20/00
(Continued)

OTHER PUBLICATIONS

"U.S. Appl. No. 16/870,672, Notice of Allowance dated Jul. 5, 2022", 12 pages.
(Continued)

*Primary Examiner* — Dov Popovici
(74) *Attorney, Agent, or Firm* — SCHWEGMAN LUNDBERG & WOESSNER, P.A.

(57) ABSTRACT

In some example embodiments, a computer-implemented method may include training a machine learning model in a first database instance using a machine learning algorithm and a training dataset in response to receiving a request to train, serializing the trained machine learning model into a binary file in response to the training of the machine learning model, recreating the trained machine learning model in a second database instance using the binary file in response to receiving a request to apply the machine learning model, and generating an inference result by applying the recreated trained machine learning model on the inference dataset in the second database instance.

20 Claims, 7 Drawing Sheets

Related U.S. Application Data continuation of application No. 16/870,672, filed on May 8, 2020, now Pat. No. 11,494,672.

(51) Int. Cl.
    *G06F 18/243*    (2023.01)
    *G06N 3/063*    (2023.01)
    *G06N 20/00*    (2019.01)
    *G06F 16/2458*    (2019.01)

(52) U.S. Cl.
    CPC ............... *G06N 5/04* (2013.01); *G06N 20/00* (2019.01); *G06F 16/2458* (2019.01)

(56) References Cited

U.S. PATENT DOCUMENTS

| | | | |
|---|---|---|---|
| 11,755,896 B2 * | 9/2023 | Furlanetto | G06N 3/08 706/46 |
| 2020/0393818 A1 * | 12/2020 | Zhang | G06N 20/20 |
| 2021/0118557 A1 * | 4/2021 | Pauws | G16H 40/20 |
| 2021/0350254 A1 | 11/2021 | Furlanetto et al. | |
| 2023/0030608 A1 | 2/2023 | Furlanetto et al. | |

OTHER PUBLICATIONS

"U.S. Appl. No. 17/964,490, Notice of Allowance dated May 1, 2023", 21 pages.

"U.S. Appl. No. 17/964,490, PTO Response to Rule 312 Communication dated Aug. 8, 2023", 2 pgs.

\* cited by examiner

CROSS IN-DATABASE MACHINE LEARNING

CROSS-REFERENCE TO RELATED APPLICATIONS

This application is a continuation of prior U.S. application Ser. No. 17/964,490, filed on Oct. 12, 2022, which is a continuation of prior U.S. application Ser. No. 16/870,672, filed on May 8, 2020, which applications are incorporated by reference herein in their entireties.

TECHNICAL FIELD

The present application relates generally to the technical field of electrical computer systems, and, in various embodiments, to systems and methods of implementing in-database machine learning across different database instances.

BACKGROUND

Some database systems offer machine learning functionalities embedded with the database systems themselves to optimize the creation of machine learning models by using in-database optimizations. However, there are currently no efficient solutions for training a machine learning model in one database instance and applying the trained machine learning model in another database instance. Although users may manually copy the trained machine learning model from one database instance in which the machine learning model was trained to another database instance in which the machine learning model is to be used, many users do not have the technical expertise to implement this solution, making it very difficult to implement and use. Additionally, the transfer of data associated with manually copying the trained machine learning model from one database instance to another database instance involves an inefficient consumption of electronic resources, such as network bandwidth that is consumed by such a data transfer. Furthermore, other solutions such as retraining the machine learning model in a second database instance after already training the machine learning model in a first database instance are inefficient, as they create an additional workload on the underlying computer system, thereby affecting the speed and effectiveness of the computer system. The present disclosure addresses these and other technical problems.

BRIEF DESCRIPTION OF THE DRAWINGS

Some example embodiments of the present disclosure are illustrated by way of example and not limitation in the FIGURES of the accompanying drawings, in which like reference numbers indicate similar elements.

DETAILED DESCRIPTION

Figure 1:
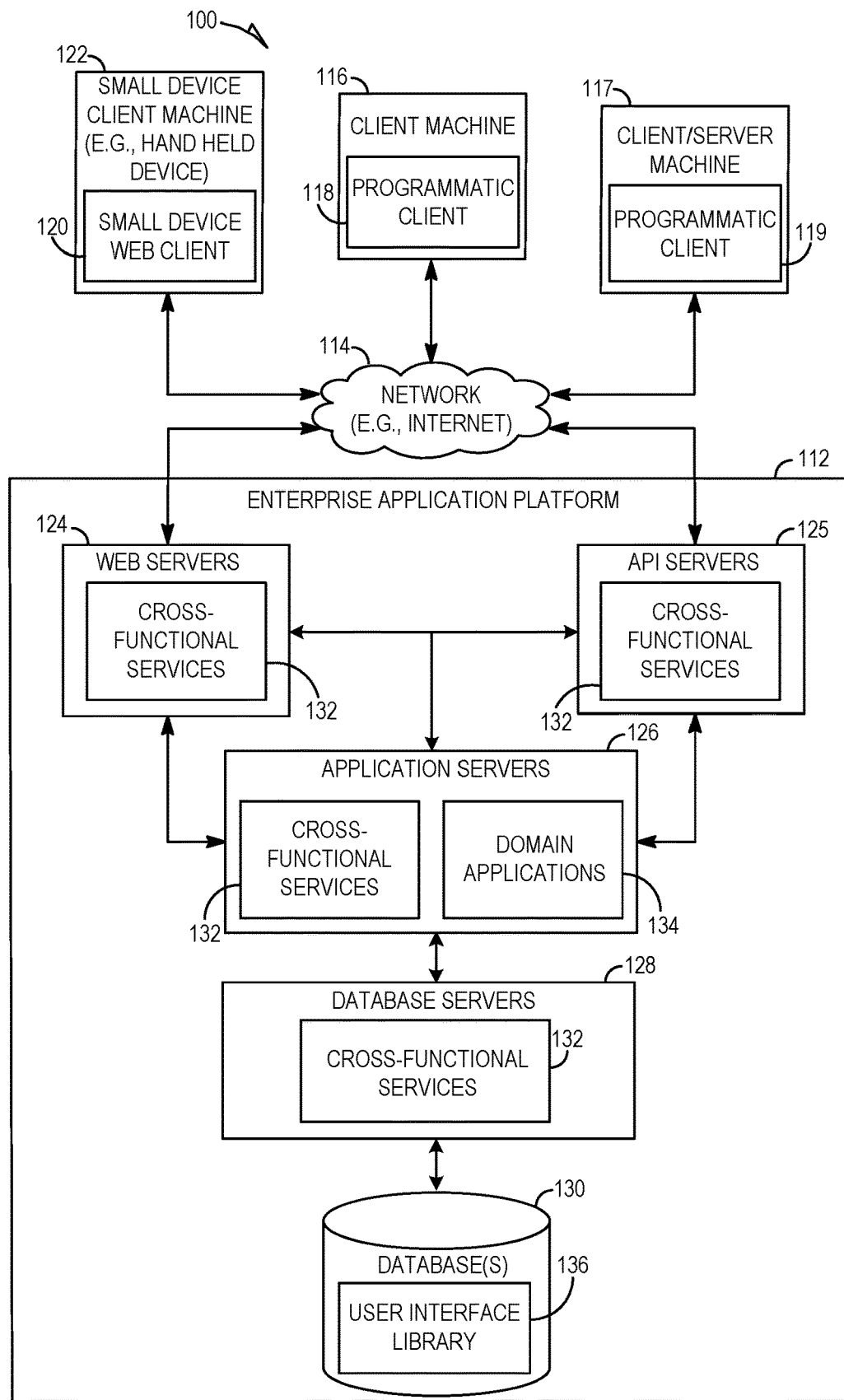
FIG. 1 is a network diagram illustrating a system, in accordance with some example embodiments.

Example methods and systems for implementing in-database machine learning across different database instances are disclosed. In the following description, for purposes of explanation, numerous specific details are set forth in order to provide a thorough understanding of example embodiments. It will be evident, however, to one skilled in the art that the present embodiments can be practiced without these specific details.

The implementation of the features disclosed herein involves a non-generic, unconventional, and non-routine operation or combination of operations. By applying one or more of the solutions disclosed herein, some technical effects of the system and method of the present disclosure are to provide a computer system that is configured to automatically serialize a trained machine learning model into a binary file in response to the machine learning model being trained in a first database instance, and to automatically recreate the trained machine learning model in a second database instance using the binary file in response to a request to apply the trained machine learning model. As a result of the features disclosed herein, the functioning of the computer system is improved, as the automatic serialization of the trained machine learning model into a binary file that can be used to recreate the trained machine learning model in another database instance makes it easier for an unskilled user to use in-database machine learning across different database instances, eliminates the consumption of network bandwidth associated with transferring the training dataset used to train the machine learning model to another database instance for retraining, guarantees consistency with the model, as retraining the machine learning model in a different database instance may result in a model that is different from the original model (e.g., due to the use of randomization or different component versions), eliminates the additional workload associated with retraining the machine learning model in the other database instance, and addresses challenges encountered when extracting datasets from a database instance (e.g., data privacy issues, extraction policies). Other technical effects will be apparent from this disclosure as well.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

FIG. 1 is a network diagram illustrating a system 100, in accordance with some example embodiments. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The web servers 124, API servers 125, application servers 126, and database servers 128 can host cross-functional services 132. The cross-functional services 132 can include relational database modules to provide support services for access to the database(s) 130, which includes a user interface library 136. The application servers 126 can further host domain applications 134. The web servers 124 and the API servers 125 may be combined.

The cross-functional services 132 provide services to users and processes that utilize the enterprise application platform 112. For instance, the cross-functional services 132 can provide portal services (e.g., web services), database services, and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. In some example embodiments, the system 100 comprises a client-server system that employs a client-server architecture, as shown in FIG. 1. However, the embodiments of the present disclosure are, of course, not limited to a client-server architecture, and could equally well find application in a distributed, or peer-to-peer, architecture system.

The enterprise application platform 112 can improve (e.g., increase) accessibility of data across different environments of a computer system architecture. For example, the enterprise application platform 112 can effectively and efficiently enable a user to use real data created from use by one or more end users of a deployed instance of a software solution in a production environment when testing an instance of the software solution in the development environment. The enterprise application platform 112 is described in greater detail below in conjunction with FIGS. 2-7.

Figure 2:
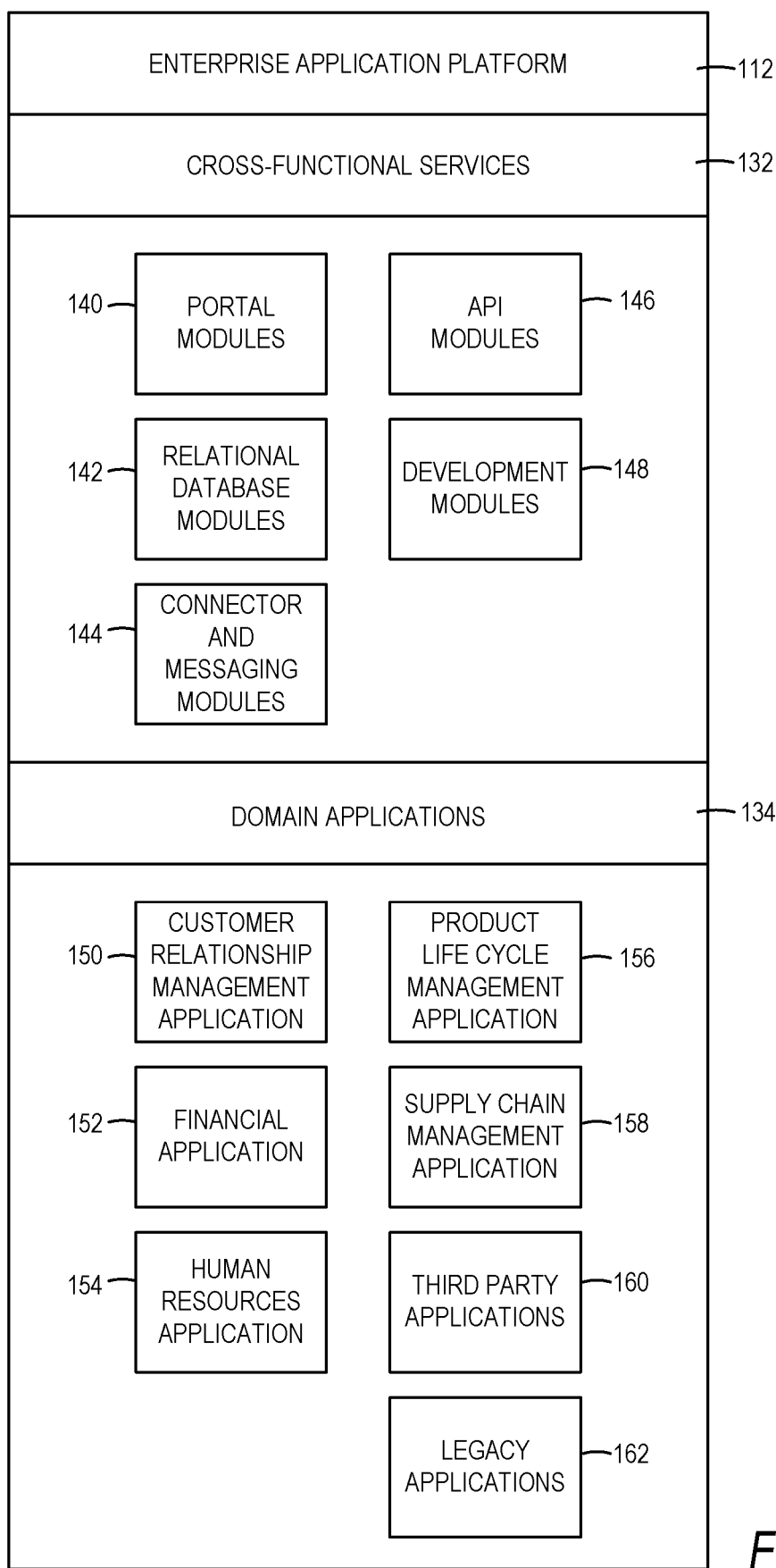
FIG. 2 is a block diagram illustrating enterprise applications and services in an enterprise application platform, in accordance with some example embodiments.

FIG. 2 is a block diagram illustrating enterprise applications and services in an enterprise application platform 112, in accordance with an example embodiment. The enterprise application platform 112 can include cross-functional services 132 and domain applications 134. The cross-functional services 132 can include portal modules 140, database modules 142 (e.g., relational database modules), connector and messaging modules 144, API modules 146, and development modules 148.

The portal modules 140 can enable a single point of access to other cross-functional services 132 and domain applications 134 for the client machine 116, the small device client machine 122, and the client/server machine 117. The portal modules 140 can be utilized to process, author and maintain web pages that present content (e.g., user interface elements and navigational controls) to the user. In addition, the portal modules 140 can enable user roles, a construct that associates a role with a specialized environment that is utilized by a user to execute tasks, utilize services, and exchange information with other users within a defined scope. For example, the role can determine the content that is available to the user and the activities that the user can perform. The portal modules 140 include a generation module, a communication module, a receiving module and a regenerating module. In addition, the portal modules 140 can comply with web services standards and/or utilize a variety of Internet technologies including JAVA®, J2EE, SAP's Advanced Business Application Programming Language (ABAP®) and Web Dynpro, XML, JCA, JAAS, X.509, LDAP, WSDL, WSRR, SOAP, UDDI and MICROSOFT® .NET®.

The database modules 142 can provide support services for access to the database(s) 130, which includes a user interface library 136. The database modules 142 can provide support for object relational mapping, database independence, and distributed computing. The database modules 142 can be utilized to add, delete, update, and manage database elements. In addition, the database modules 142 can comply with database standards and/or utilize a variety of database technologies including SQL, SQLDBC, Oracle, MySQL, Unicode, JDBC, or the like.

The connector and messaging modules 144 can enable communication across different types of messaging systems that are utilized by the cross-functional services 132 and the domain applications 134 by providing a common messaging application processing interface. The connector and messaging modules 144 can enable asynchronous communication on the enterprise application platform 112.

The API modules 146 can enable the development of service-based applications by exposing an interface to existing and new applications as services. Repositories can be included in the platform as a central place to find available services when building applications.

The development modules 148 can provide a development environment for the addition, integration, updating, and extension of software components on the enterprise application platform 112 without impacting existing cross-functional services 132 and domain applications 134.

Turning to the domain applications 134, a customer relationship management application 150 can enable access to and can facilitate collecting and storing of relevant personalized information from multiple data sources and business processes. Enterprise personnel that are tasked with developing a buyer into a long-term customer can utilize the customer relationship management applications 150 to provide assistance to the buyer throughout a customer engagement cycle.

Enterprise personnel can utilize financial applications 152 and business processes to track and control financial transactions within the enterprise application platform 112. The financial applications 152 can facilitate the execution of operational, analytical, and collaborative tasks that are associated with financial management. Specifically, the financial applications 152 can enable the performance of tasks related to financial accountability, planning, forecasting, and managing the cost of finance.

Human resource applications 154 can be utilized by enterprise personnel and business processes to manage, deploy, and track enterprise personnel. Specifically, the human resource applications 154 can enable the analysis of human resource issues and facilitate human resource decisions based on real-time information.

Product life cycle management applications 156 can enable the management of a product throughout the life cycle of the product. For example, the product life cycle management applications 156 can enable collaborative engineering, custom product development, project management, asset management, and quality management among business partners.

Supply chain management applications 158 can enable monitoring of performances that are observed in supply chains. The supply chain management applications 158 can facilitate adherence to production plans and on-time delivery of products and services.

Third-party applications 160, as well as legacy applications 162, can be integrated with domain applications 134 and utilize cross-functional services 132 on the enterprise application platform 112.

Figure 3:
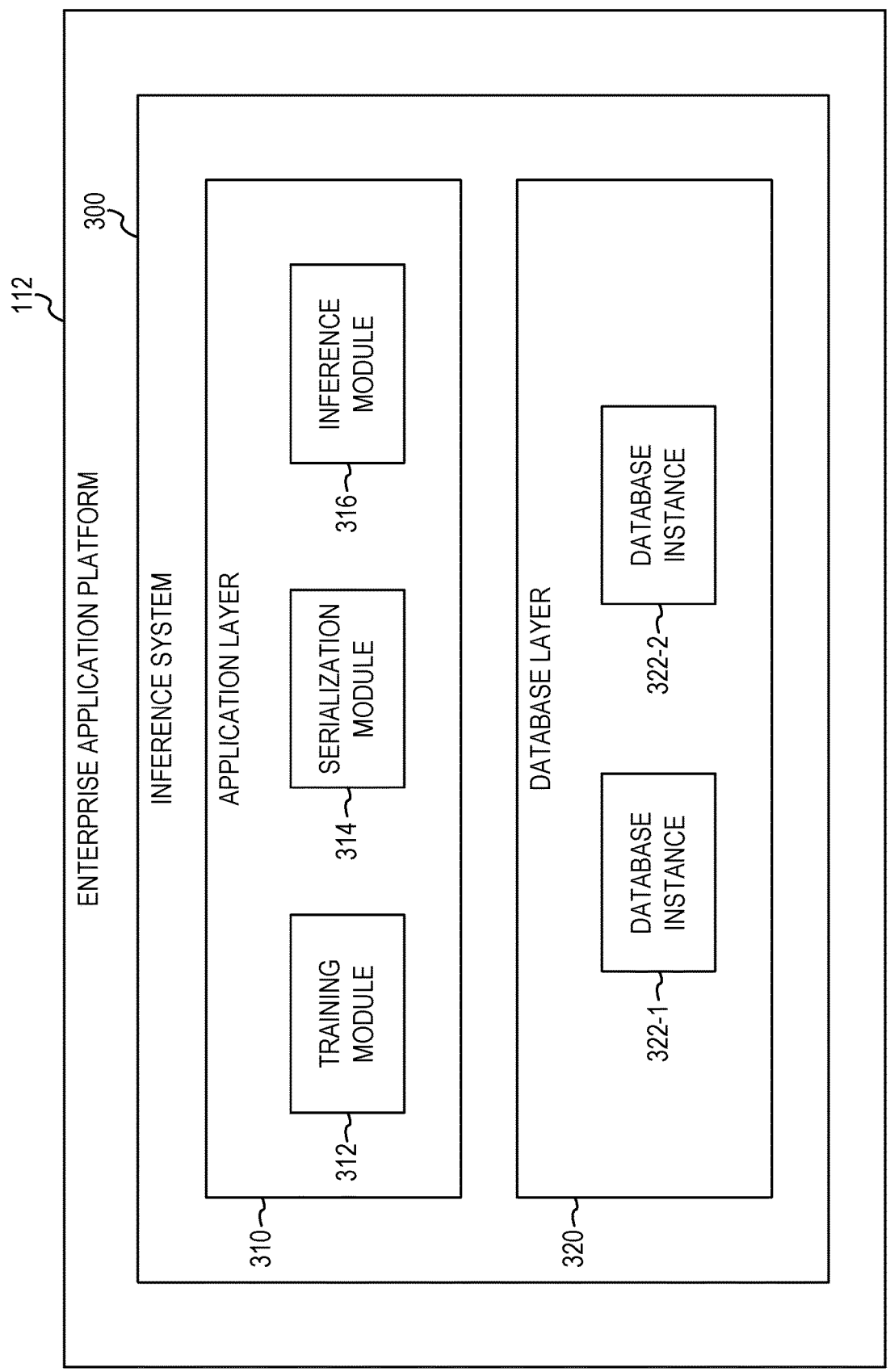
FIG. 3 is a block diagram illustrating components of an inference system, in accordance with some example embodiments.

FIG. 3 is a block diagram illustrating components of an inference system 300, in accordance with some example embodiments. In some embodiments, the inference system 300 is implemented as part of an application platform, such as the enterprise application platform 112, and comprises an application layer 310 and a database layer 320. The application layer 310 may be configured to process data using application logic, as well as communicate with both a presentation layer (not shown) configured to provide user interface functionality (e.g., providing graphical user interface to users, enabling users to enter data, displaying processed data to the users) and the database layer 320. The database layer 320 may be configured to store and manage data, such as by using a database management system to manage database instances 322. The database layer 320 may also be configured to be used for training machine learning models and generating inferences using the trained machine learning models.

In some example embodiments, the inference system 300 comprises any combination of one or more of a training module 312, a serialization module 314, and an inference module 316. The training module 312, the serialization module 314, and the inference module 316, as well as the database instances 322, can reside on a computer system, or other machine, having a memory and at least one processor (not shown). In some embodiments, the training module 312, the serialization module 314, the inference module 316, and the database instances 322 are incorporated into the enterprise application platform 112 in FIGS. 1 and 2. However, it is contemplated that other configurations of the training module 312, the serialization module 314, the inference module 316, and the database instances 322 are also within the scope of the present disclosure.

In some example embodiments, the training module 312, the serialization module 314, and the inference module 316 are configured to provide a variety of user interface functionality, such as generating user interfaces, interactively presenting user interfaces to the user, receiving information from the user (e.g., interactions with user interfaces), and so on. Presenting information to the user can include causing presentation of information to the user (e.g., communicating information to a device with instructions to present the information to the user). Information may be presented using a variety of means including visually displaying information and using other device outputs (e.g., audio, tactile, and so forth). Similarly, information may be received via a variety of means including alphanumeric input or other device input (e.g., one or more touch screen, camera, tactile sensors, light sensors, infrared sensors, biometric sensors, microphone, gyroscope, accelerometer, other sensors, and so forth). In some example embodiments, the training module 312, the serialization module 314, and the inference module 316 are configured to receive user input. For example, the training module 312, the serialization module 314, and the inference module 316 can present one or more graphical user interface (GUI) elements (e.g., drop-down menu, selectable buttons, text field) with which a user can submit input. In some example embodiments, the training module 312, the serialization module 314, and the inference module 330 are configured to perform various communication functions to facilitate the functionality described herein, such as by communicating with a computing device (e.g., the small device client machine 122, the client machine 116, or the client/server machine 117) via the network 114 using a wired or wireless connection, as well as by communicating with the database instances 322.

In some example embodiments, the inference system 300 is configured to provide predictive analytic functionality to end users. For example, the inference system 300 may use techniques such as data mining, statistics, and machine learning to generate inferences or predict the possibility of an event occurring based on input data, such as historical data. The inference system 300 may provide a predictive analysis library that defines functions that can be called from within database procedures to perform analytic algorithms. Although software developers may define complex application logic inside database procedures, it is difficult to describe predictive analysis logic with procedures. For example, an application may need to perform a cluster analysis in a huge customer table with one trillion records. It is extremely difficult to implement the analysis in a procedure using the simple classic K-means algorithms or with more complicated algorithms in the data-mining area, and transferring large tables of data to an application server to perform the K-means calculation is operationally expensive. The predictive analysis library defines functions that can be called from within database procedures to perform analytic algorithms. Furthermore, the predictive analysis library may also provide machine learning algorithms that dynamically learn and update a predictive model, also referred to herein as a machine learning model.

Figure 4:
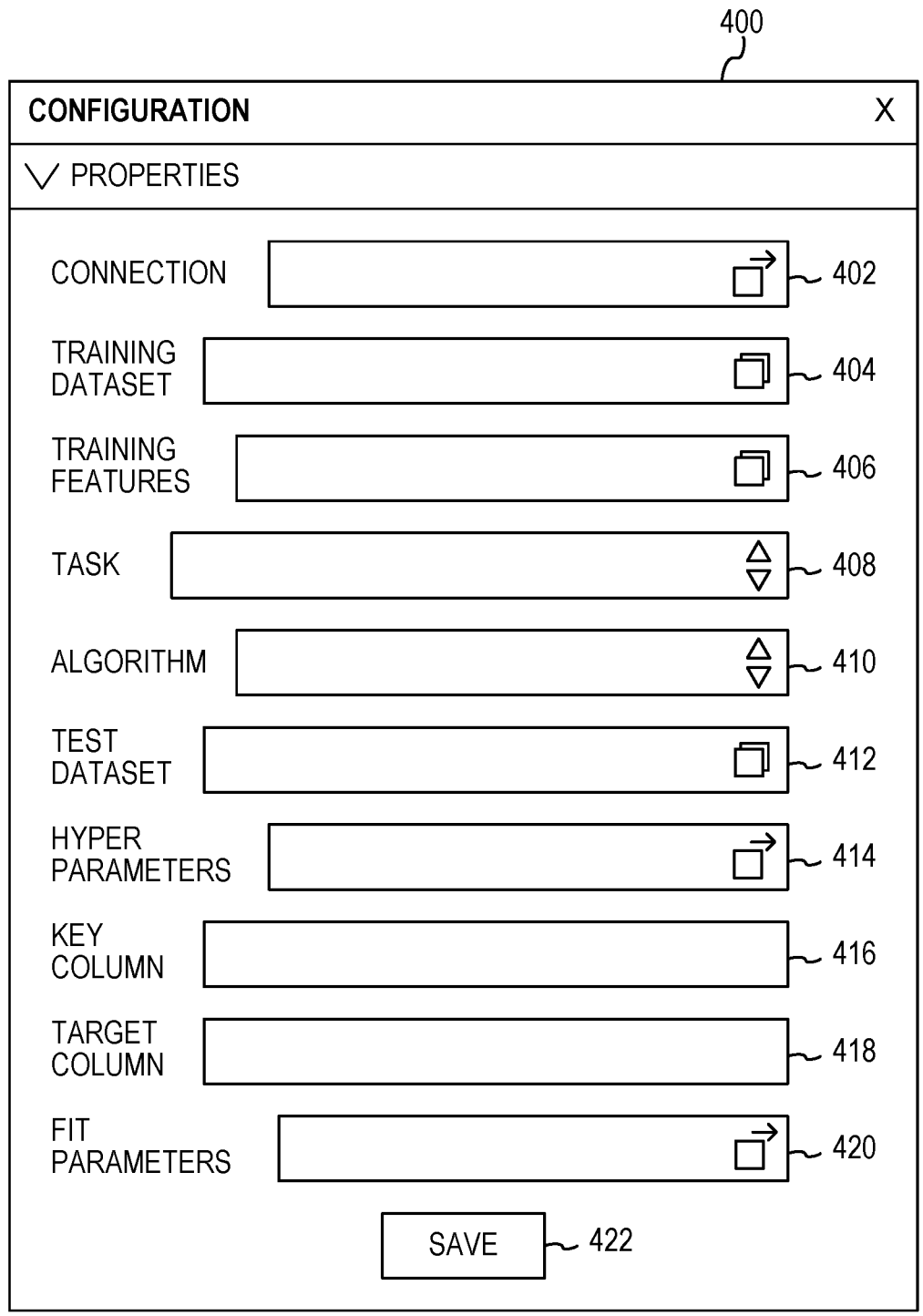
FIG. 4 illustrates a graphical user interface (GUI) configured to enable a user to specify a training configuration for training a machine learning model, in accordance with some example embodiments.

In some example embodiments, the training module 312 is configured to receive a request to train a machine learning model from a computing device of a user. The request to train the machine learning model may comprise a training configuration specified by the user via a user interface displayed on the computing device. FIG. 4 illustrates a graphical user interface (GUI) 400 configured to enable a user to specify a training configuration for training a machine learning model, in accordance with some example embodiments. The GUI 400 comprises user interface elements 402-420 configured to enable the user to select, input, or otherwise specify elements of the training configuration, as well as a selectable user interface element 422 configured to save the user-specified elements of the training configuration in response to its selection.

The user interface element 402 is configured to enable the user to select, input, or otherwise specify connection details to a database instance in which the machine learning model will be trained. For example, the connection details may comprise an object containing connection parameters to a database instance with a predictive analysis library installed, so that the predictive analysis library may be used in the training of the machine learning model. The user interface element 404 is configured to enable the user to select, input, or otherwise specify a training dataset, such as a name of a table containing training data for use in the training of the machine learning model. The user interface element 406 is configured to enable the user to select, input, or otherwise specify one or more training features, such as an array of objects describing columns from the training dataset that will be considered as features for the machine learning model in the training of the machine learning model. The user interface element 408 is configured to enable the user to select, input, or otherwise specify a task, such as a type of the machine learning model that will be trained or otherwise generated. The user interface element 410 is configured to enable the user to select, input, or otherwise specify a machine learning algorithm that will be used to train the machine learning model. Examples of the machine learning algorithm include, but are not limited to, a linear regression algorithm, a logistical regression algorithm, a gradient boosting algorithm, a neural network algorithm, or a decision tree learning algorithm. Other types of machine learning algorithms are also within the scope of the present disclosure and may be presented as options for user selection or specification.

The user interface element 412 is configured to enable the user to select, input, or otherwise specify a test dataset, such as a name of a table containing data to be used in testing the trained machine learning model. The user interface element 414 is configured to enable the user to select, input, or otherwise specify one or more hyperparameters that can be used to fine-tune the machine learning model. The format of the hyperparameters may be dependent on the type of machine learning algorithm that is specified by the user. The user interface element 416 is configured to enable the user to select, input, or otherwise specify a key column, such as a name of a column containing a training table key. In some example embodiments, such as when the machine learning algorithm is a supervised learning algorithm, the user interface element 418 is configured to enable the user to select, input, or otherwise specify a target column, such as a name of a column containing a target variable in the training table. The target variable is the variable to be predicted by the machine learning model. However, in other embodiments, such as when a clustering algorithm is selected as the machine learning algorithm, the user interface element 418 is not included, as a target variable is not appropriate for input in such cases. The user interface element 420 is configured to enable the user to select, input, or otherwise specify one or more fit parameters to be used in fitting the machine learning model to data. The fit parameters may be dependent on the type of machine learning algorithm specified by the user. Other user interface elements for specifying other elements of the training configuration are also within the scope of the present disclosure.

In some example embodiments, the training module 312 is configured to start preliminary operations for a training process. For example, the training module 312 may connect to the database having the predictive analysis library using configured credentials through a secure connection, such as by using the connection parameters specified in the training configuration. The training module 312 may also assemble the required structured query language (SQL) statement used to extract the training dataset according to configured table and column names into temporary tables. In embodiments where a test dataset is provided, the training dataset is used for training the machine learning model, whereas the test dataset is used to score or otherwise evaluate the trained machine learning model. In some example embodiments, the training module 312 creates an instance of the specified machine learning algorithm with selected hyperparameters and any additional configuration elements specified in the training configuration.

In some example embodiments, the selection of the user interface element 422 to save the user-specified elements of the training configuration also triggers the request to train machine learning model. However, the request to train the machine learning model may also be triggered via user selection of another user interface element. For example, the request to train the machine learning model may be triggered by the application layer in a different step other than saving the training configuration, such as in another GUI separate from the GUI 400.

In some example embodiments, in response to receiving the request to train the machine learning model, the training module 312 triggers an in-database training of the machine learning model in a first database instance 322-1 using the machine learning algorithm and the training dataset specified in the training configuration included in the request. As a result of the triggering of the training of the machine learning model, the SQL commands to create and train the machine learning model are executed in the first database instance 322-1. The training process varies according to the machine learning algorithm specified in the training configuration of the request to train the machine learning model. For example, a least squares method may be used for a linear regression algorithm, whereas a backpropagation method may be used for a neural network algorithm.

In some example embodiments, the in-database training of the machine learning model in the first database instance 322-1 results in the generation of one or more tables that store model data of the trained machine learning model. These resulting tables may be created as temporary tables, meaning that they are transient to the current database session. In embodiments in which a test dataset is specified in the training configuration, the trained machine learning model is applied on the test dataset to calculate performance metrics, which is performed as an in-database operation in the first database instance 322-1.

In some example embodiments, the serialization module 314 is configured to serialize the trained machine learning model into a binary file in response to the training of the machine learning model. For example, the serialization module 314 may translate data structures or object state information of the trained machine learning model into a format that can be stored (e.g., in a file or in a memory buffer) or transmitted (e.g., across a network connection link) and reconstructed later (e.g., in a different computer environment).

The trained machine learning model may be serialized into a single binary file as an artifact containing model parameters of the trained machine learning model. The type of model parameters may depend on the type of machine learning algorithm used to train the machine learning model. For example, the model parameters may include values representing weights for neural network algorithms, coefficients for linear regression algorithms, and rules for decision tree algorithms. The model parameters may be stored as a two-dimensional size-mutable, potentially heterogeneous tabular data structure with labeled axes of rows and columns, where arithmetic operations align on both row and column labels.

The binary file may also comprise one or more of the structure of the training dataset used for training (e.g., name and type of columns), statistics and performance metrics of the trained machine learning model based on testing (e.g., accuracy, specificity, sensitivity, mean square error, root mean square error, mean absolute error, R-squared), and metadata related to the trained machine learning model (e.g., name of the machine learning algorithm used, specified hyperparameters).

In some example embodiments, the single binary file artifact is, then, stored by the serialization module 314 in a persistence layer of the application platform 112 (e.g., within a data lake or file system of the application platform112) to be retrieved at a later point in time. All of the data included in the single binary file artifact may be environment-independent, so that it can be deployed in database instances 322 other than the first database instance 322-1, as long as the other database instances 322 contain the necessary runtime libraries for executing the trained machine learning model. As a result, the trained machine learning model is no longer bound to the first database instance 322-1 in which it was trained.

Figure 5:
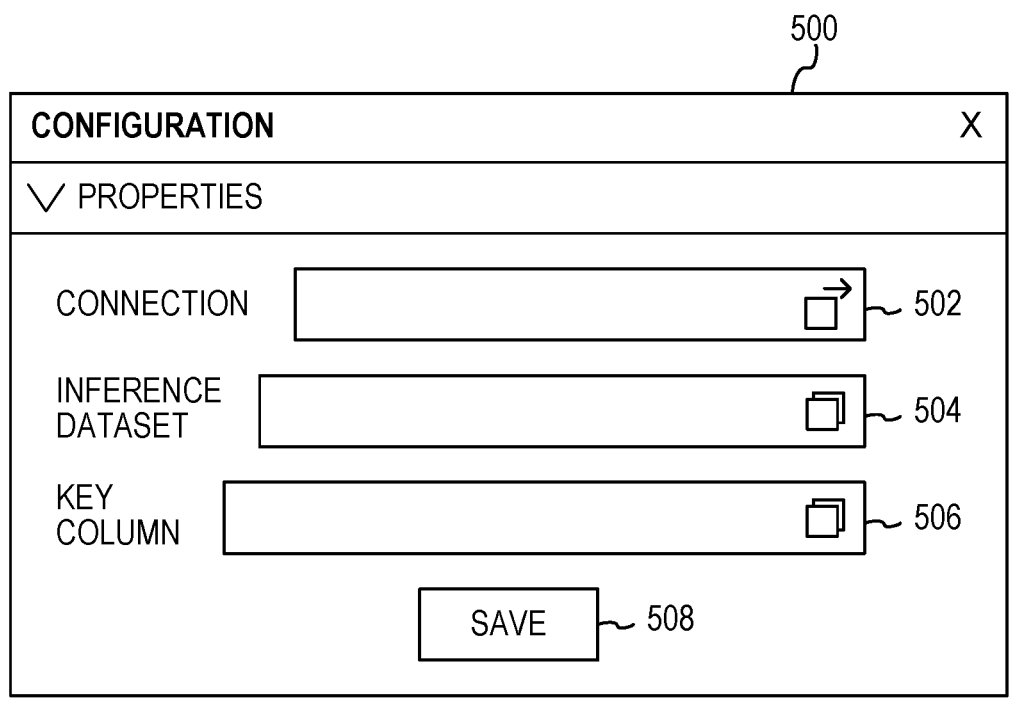
FIG. 5 illustrates a GUI configured to enable a user to specify an inference configuration for generating an inference result, in accordance with some example embodiments.

In some example embodiments, the inference module 316 is configured to receive a request to apply the trained machine learning model from a computing device of a user, such as the computing device of the user that requested the training of the machine learning model or another computing device of another user. The request to apply the trained machine learning model may comprise an inference configuration specified by a user. FIG. 5 illustrates a GUI 500 configured to enable a user to specify an inference configuration for generating an inference result, in accordance with some example embodiments. The GUI 500 comprises user interface elements 502, 504, and 506 configured to enable the user to select, input, or otherwise specify elements of the training configuration, as well as a selectable user interface element 508 configured to save the user-specified elements of the inference configuration in response to its selection.

The user interface element 502 is configured to enable the user to select, input, or otherwise specify connection details to a database instance in which the trained machine learning model will be deployed. For example, the connection details may comprise an object containing connection parameters to a database instance with a predictive analysis library installed, so that the predictive analysis library may be used in the application of the trained machine learning model on an inference dataset. The user interface element 504 is configured to enable the user to select, input, or otherwise specify an inference dataset, such as by enabling the user to specify an identification of a table containing inference data to be applied to the trained machine learning model. Alternatively, the inference data may be provided via API calls. The user interface element 506 is configured to enable the user to select, input, or otherwise specify a name of a column containing an inference table key. Other user interface elements for specifying other elements of the inference configuration are also within the scope of the present disclosure.

In some example embodiments, the inference module 316 is configured to trigger the recreation and application of the trained machine learning model in a second database instance 322-2 different from the first database instance 322-1 using the binary file in response to receiving of a request to apply the trained machine learning model. In some example embodiments, the selection of the user interface element 508 to save the user-specified elements of the inference configuration also triggers the request to apply the trained machine learning model. However, the request to apply the trained machine learning model may also be triggered via user selection of another user interface element. For example, the request to train the machine learning model may be triggered by the application layer in a different step other than saving the training configuration.

In some example embodiments, the inference module 316 recreates the trained machine learning model by connecting to the second database instance 322-2 using configured credentials through a secure connection and restoring the trained machine learning model to the second database instance 322-2 as temporary tables. For example, the inference module 316 may re-instantiate the trained machine learning model object from the binary file, recreate the model data from the serialized data of the binary file into temporary tables on the second database instance 322-2, and then insert the model data from the binary file into temporary tables. The inference module 316 may then create an SQL statement for the inference dataset, such as an SQL statement for a table that was specified as the inference dataset configuration or for an incoming payload data. In an embodiment in which incoming payload data is to be used as the inference dataset, a temporary table may be created in the second database instance 322-2 containing the payload data.

In some example embodiments, an inference result is generated by applying the recreated trained machine learning model on the inference dataset in the second database instance 322-2 based on the receiving of the request to apply the trained machine learning model. For example, the second database instance 322-2 may apply the trained machine learning model on the inference dataset as an in-database operation performed in the second database instance 322-2, with the corresponding function that processes inference for the machine learning algorithm being executed and the aforementioned required model tables and the inference dataset already being loaded.

In some example embodiments, the inference module 316 is configured to perform one or more functions of the enterprise application platform 112 using the generated inference result. For example, the inference system 300 may transfer the generated inference result from the second database instance 322-2 to the application layer 310, such as to the inference module 316, where the generated inference result may be used in a function of the enterprise application platform 112. One example of a function of the enterprise application platform 112 comprises causing the generated inference result to be displayed on a computing device of a user of the enterprise application platform 112. However, the generated inference result may be used in other functions as well.

Figure 6:
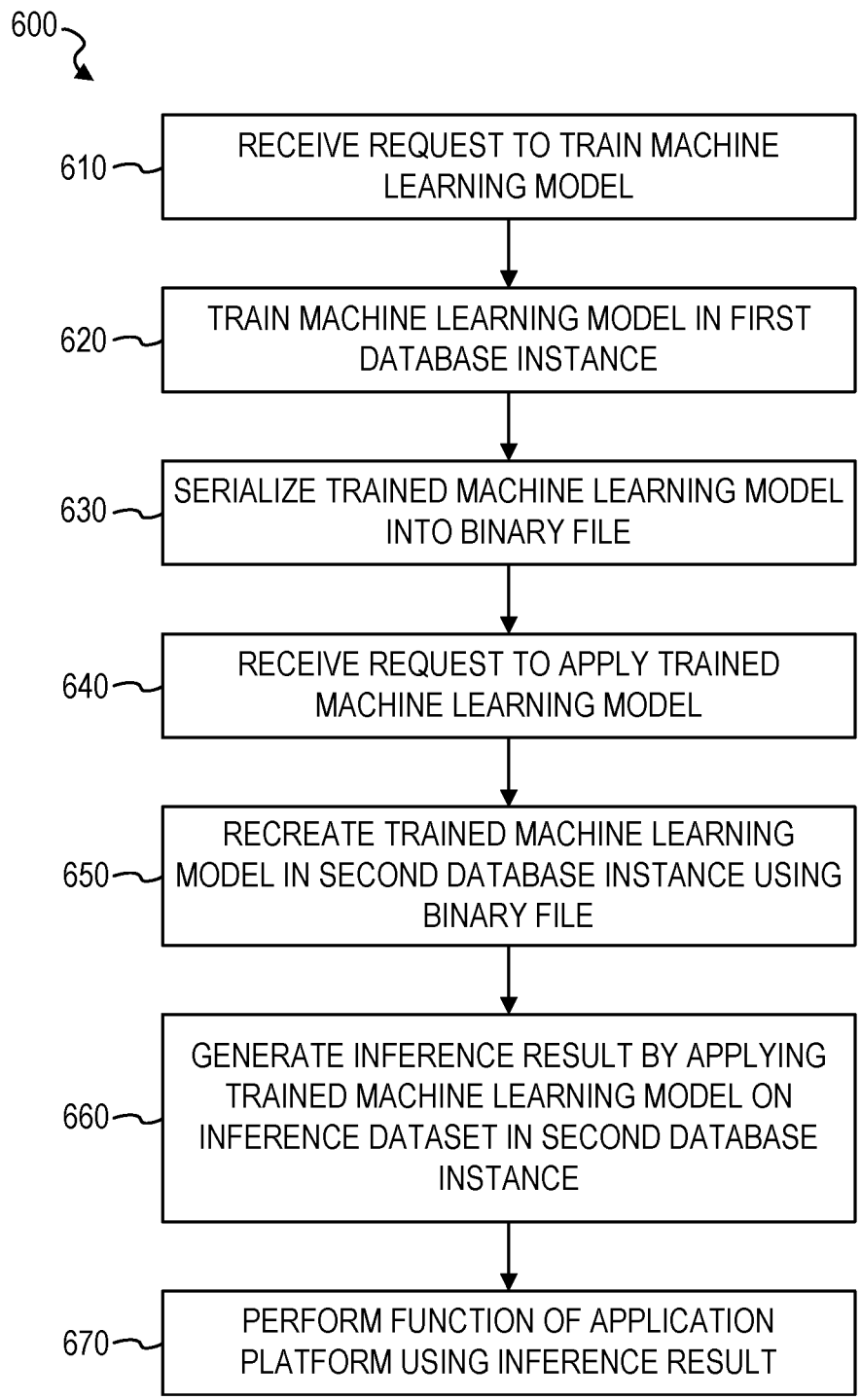
FIG. 6 is a flowchart illustrating a method of implementing in-database machine learning across different database instances, in accordance with some example embodiments.

FIG. 6 is a flowchart illustrating a method of implementing in-database machine learning across different database instances, in accordance with some example embodiments. The method 600 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 600 are performed by the inference system 300 of FIG. 3, as described above.

At operation 610, the inference system 300 receives a request to train a machine learning model from a computing device of a user. The request to train the machine learning model may comprise a training configuration specified by the user via a user interface displayed on the computing device. In some example embodiments, the training configuration indicates one or more of a machine learning algorithm, a training dataset, and one or more hyperparameters to be used in the training of the machine learning model. However, the training configuration may indicate other configuration elements for the training of the machine learning model as well.

At operation 620, the inference system 300 trains the machine learning model in a first database instance 322-1 within a database layer 320 of an application platform 112 using the machine learning algorithm and the training dataset. For example, the training dataset may comprise a set of examples used to fit the parameters (e.g., weights of connections between neurons in artificial neural networks) of the machine learning model. The model fitting can include both variable selection and parameter estimation. The training dataset may comprise pairs of an input vector (or scalar) and the corresponding output vector (or scalar), where the answer key is commonly denoted as the target (or label). In some example embodiments, such as embodiments in which the machine learning algorithm involves a neural network, the current machine learning model is run with the training dataset and produces a result, which is then compared with the target, for each input vector in the training dataset. Based on the result of the comparison and the specific machine learning algorithm being used, the parameters of the machine learning model are adjusted. However, in other example embodiments, such as embodiments in which the machine learning algorithm involves linear regression or decision trees, a different training process may be used. In some example embodiments, the training of the machine learning model at operation 620 is performed in response to the receiving of the request to train the machine learning model at operation 610.

At operation 630, the inference system 300 serializes the trained machine learning model into a binary file in an application layer of the application platform in response to the training of the machine learning model at operation 620. The binary file may comprise model parameters of the trained machine learning model, such as weights for a neural network model, coefficients for a linear regression model, or rules for a decision tree model. The binary file may also comprise an identification of the machine learning algorithm and hyperparameters of the trained machine learning model. In some example embodiments, the binary file is automatically stored in the application layer 310 of the application platform 112 for subsequent access by the inference system 300 when recreating the trained machine learning model in a second database instance 322-2.

At operation 640, the inference system 300 receives, from the computing device of the user or from another computing device of another user, a request to apply the trained machine learning model. The request to apply the trained machine learning model may include an inference configuration and may be triggered by a user selection of a user interface element, as previously discussed.

At operation 650, the inference system 300 recreates the trained machine learning model in the second database instance 322-2 within the database layer 320 of the application platform 112 using the binary file. In some example embodiments, the recreation of the trained machine learning model at operation 650 is performed in response to the receiving of the request to apply the machine learning model at operation 640. The inference system 300 may connect to the second database instance 322-2 using configured credentials through a secure connection and restore the trained machine learning model to the second database instance 322-2 as temporary tables. For example, the inference system 300 may re-instantiate the trained machine learning model object from the stored binary file, recreate the model data from the serialized data of the stored binary file into temporary tables on the second database instance 322-2, and then insert the model data from the stored binary file into temporary tables. The inference system 300 may then create an SQL statement for the inference dataset.

At operation 660, the inference system 300 generates an inference result by applying the recreated trained machine learning model on the inference dataset in the second database instance 322-2. The generating of the inference result at operation 660 may be performed in response to the recreating of the trained machine learning model at operation 650.

At operation 670, the inference system 300 performs a function of the application platform 112 using the generated inference result. For example, the inference system 300 may cause the inference result to be displayed on a computing device of a user. However, other types of functions of the application platform 112 are also within the scope of the present disclosure.

It is contemplated that any of the other features described within the present disclosure can be incorporated into the method 700.

The following paragraphs provide example embodiments.

Example 1 includes a computer-implemented method comprising: receiving, by a computer system having at least one hardware processor, a request to train a machine learning model from a computing device of a user, the request to train comprising a training configuration specified by the user via a user interface displayed on the computing device, the training configuration indicating a machine learning algorithm and a training dataset; training, by the computer system, the machine learning model in a first database instance using the machine learning algorithm and the training dataset in response to the receiving of the request to train; serializing, by the computer system, the trained machine learning model into a binary file in response to the training of the machine learning model; receiving, by the computer system, a request to apply the trained machine learning model from the computing device; recreating, by the computer system, the trained machine learning model in a second database instance using the binary file in response to the receiving of the request to apply, the second database instance being different from the first database instance; generating, by the computer system, an inference result by applying the recreated trained machine learning model on the inference dataset in the second database instance based on the receiving of the request to apply the trained machine learning model; and performing, by the computer system, a function of an application platform using the generated inference result.

Example 2 includes the computer-implemented method of example 1, wherein the machine learning algorithm comprises a linear regression algorithm, a logistical regression algorithm, a gradient boosting algorithm, a neural network algorithm, or a decision tree learning algorithm.

Example 3 includes the computer-implemented method of example 1 or example 2, wherein the training configuration further indicates one or more hyperparameters, the one or more hyperparameters being used in the training of the machine learning model.

Example 4 includes the computer-implemented method of any one of examples 1 to 3, wherein the binary file comprises model parameters of the trained machine learning model.

Example 5 includes the computer-implemented method of any one of examples 1 to 4, wherein the model parameters of the trained machine learning model comprise weights for a neural network model, coefficients for a linear regression model, or rules for a decision tree model.

Example 6 includes the computer-implemented method of any one of examples 1 to 5, wherein the binary file comprises an identification of the machine learning algorithm.

Example 7 includes the computer-implemented method of any one of examples 1 to 6, wherein the binary file comprises one or more hyperparameters of the trained machine learning model.

Example 8 includes the computer-implemented method of any one of examples 1 to 7, further comprising storing the binary file in an application layer of the application platform, wherein the recreating of the trained machine learning model comprises accessing the stored binary file.

Example 9 includes the computer-implemented method of any one of examples 1 to 8, wherein the function comprises causing the inference result to be displayed on the computing device.

Example 10 includes a system comprising: at least one processor; and a non-transitory computer-readable medium storing executable instructions that, when executed, cause the at least one processor to perform the method of any one of examples 1 to 9.

Example 11 includes a non-transitory machine-readable storage medium, tangibly embodying a set of instructions that, when executed by at least one processor, causes the at least one processor to perform the method of any one of examples 1 to 9.

Example 12 includes a machine-readable medium carrying a set of instructions that, when executed by at least one processor, causes the at least one processor to carry out the method of any one of examples 1 to 9.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 7:
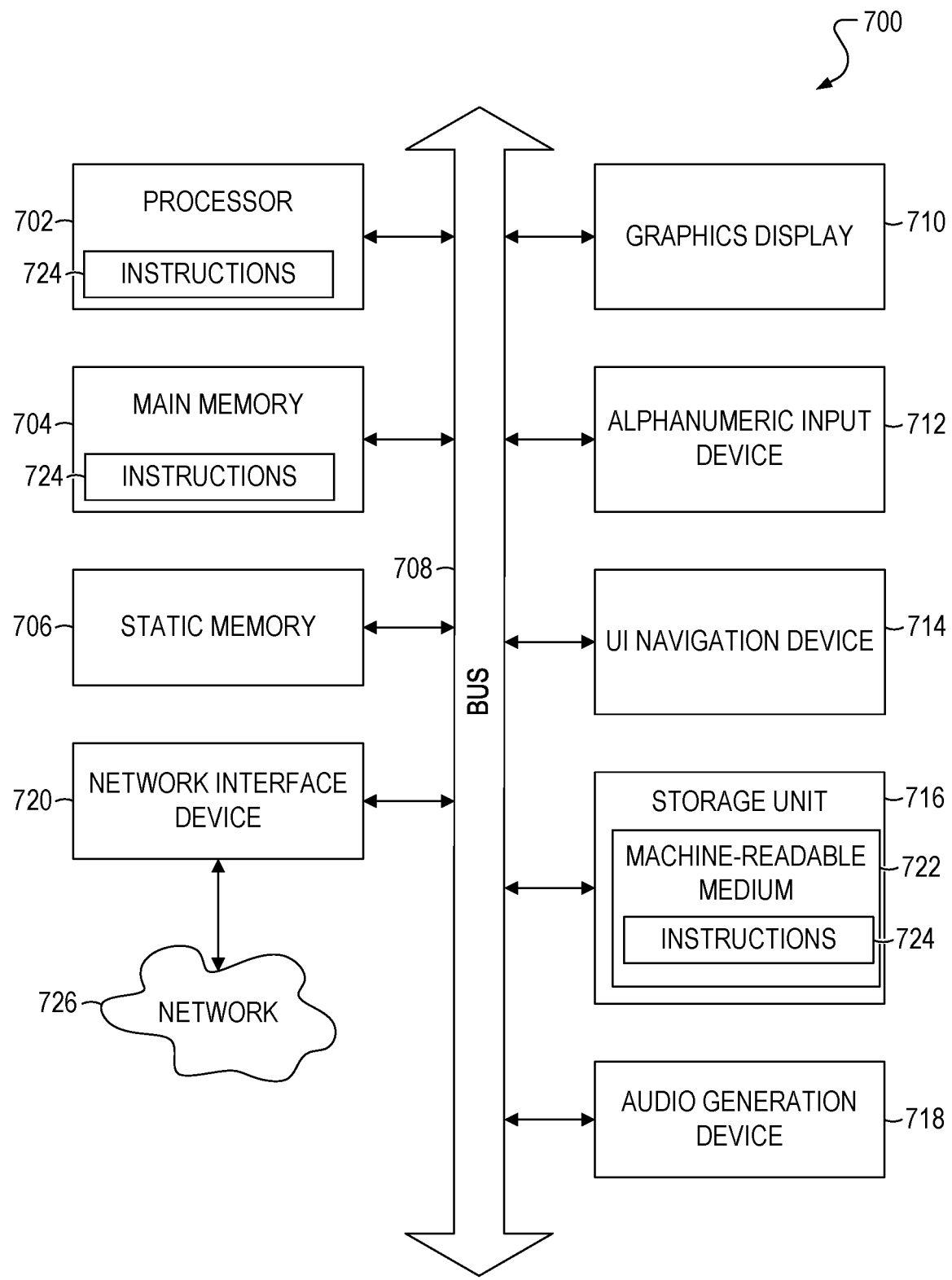
FIG. 7 is a block diagram of an example computer system on which methodologies described herein can be executed, in accordance with some example embodiments.

FIG. 7 is a block diagram of a machine in the example form of a computer system 700 within which instructions 724 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704, and a static memory 706, which communicate with each other via a bus 708. The computer system 700 may further include a graphics or video display unit 710 (e.g., a liquid crystal display (LCD) or a cathode ray tube (CRT)). The computer system 700 also includes an alphanumeric input device 712 (e.g., a keyboard), a user interface (UI) navigation (or cursor control) device 714 (e.g., a mouse), a storage unit (e.g., a disk drive unit) 716, an audio or signal generation device 718 (e.g., a speaker), and a network interface device 720.

The storage unit 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media. The instructions 724 may also reside, completely or at least partially, within the static memory 706.

While the machine-readable medium 722 is shown in an example embodiment to be a single medium, the term "machine-readable medium" may include a single medium or multiple media (e.g., a centralized or distributed database, and/or associated caches and servers) that store the one or more instructions 724 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a LAN, a WAN, the Internet, mobile telephone networks, POTS networks, and wireless data networks (e.g., WiFi and WiMAX networks). The term "transmission medium" shall be taken to include any intangible medium capable of storing, encoding, or carrying instructions for execution by the machine, and includes digital or analog communications signals or other intangible media to facilitate communication of such software.

Each of the features and teachings disclosed herein can be utilized separately or in conjunction with other features and teachings to provide a system and method for blind spot implementation in neural networks. Representative examples utilizing many of these additional features and teachings, both separately and in combination, are described in further detail with reference to the attached figures. This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The example methods or algorithms presented herein are not inherently related to any particular computer or other apparatus. Various general purpose systems, computer servers, or personal computers may be used with programs in accordance with the teachings herein, or it may prove convenient to construct a more specialized apparatus to perform the method steps disclosed herein. The structure for a variety of these systems will appear from the description herein. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the FIGURES are designed to aid in understanding how the present teachings are practiced, but not intended to limit the dimensions and the shapes shown in the examples.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method comprising:
    serializing, by a computer system having at least one hardware processor, a trained machine learning model into a binary file, the trained machine learning model having been trained in a first database instance;
    receiving, by the computer system, a request to apply the trained machine learning model from a computing device; and
    recreating, by the computer system, the trained machine learning model in a second database instance using the binary file in response to the receiving of the request to apply, the second database instance being different from the first database instance.

2. The computer-implemented method of claim 1, wherein the binary file comprises model parameters of the trained machine learning model.

3. The computer-implemented method of claim 2, wherein the model parameters of the trained machine learning model comprise weights for a neural network model, coefficients for a linear regression model, or rules for a decision tree model.

4. The computer-implemented method of claim 1, wherein the binary file comprises an identification of a machine learning algorithm.

5. The computer-implemented method of claim 1, wherein the binary file comprises one or more hyperparameters of the trained machine learning model.

6. The computer-implemented method of claim 1, further comprising storing the binary file in a persistence layer of an application platform, wherein the recreating of the trained machine learning model comprises accessing the stored binary file.

7. The computer-implemented method of claim 1, further comprising:
generating, by the computer system, an inference result by applying the recreated trained machine learning model on an inference dataset in the second database instance based on the receiving of the request to apply the trained machine learning model; and
performing, by the computer system, a function of an application platform using the generated inference result.

8. The computer-implemented method of claim 7, wherein the function comprises causing the generated inference result to be displayed on the computing device.

9. A system having a memory and at least one hardware processor, the system comprising:
a serialization component configured to serialize a trained machine learning model into a binary file, the trained machine learning model having been trained in a first database instance; and
an inference component configured to:
receive a request to apply the trained machine learning model from a computing device; and
recreate the trained machine learning model in a second database instance using the binary file in response to receiving the request to apply, the second database instance being different from the first database instance.

10. The system of claim 9, wherein the binary file comprises model parameters of the trained machine learning model.

11. The system of claim 10, wherein the model parameters of the trained machine learning model comprise weights for a neural network model, coefficients for a linear regression model, or rules for a decision tree model.

12. The system of claim 9, wherein the binary file comprises an identification of a machine learning algorithm.

13. The system of claim 9, wherein the binary file comprises one or more hyperparameters of the trained machine learning model.

14. The system of claim 9, wherein the serialization component is further configured to storing the binary file in a persistence layer of an application platform, and the inference component is configured to access the stored binary file in the recreating of the trained machine learning model.

15. The system of claim 9, wherein the inference component is further configured to:
generate an inference result by applying the recreated trained machine learning model on an inference dataset in the second database instance based on the receiving of the request to apply the trained machine learning model; and
perform a function of an application platform using the generated inference result.

16. The system of claim 15, wherein the function comprises causing the generated inference result to be displayed on the computing device.

17. A non-transitory machine-readable storage medium, tangibly embodying a set of instructions that, when executed by at least one hardware processor, causes the at least one hardware processor to perform operations comprising:
serializing a trained machine learning model into a binary file, the trained machine learning model having been trained in a first database instance;
receiving a request to apply the trained machine learning model from a computing device; and
recreating the trained machine learning model in a second database instance using the binary file in response to the receiving of the request to apply, the second database instance being different from the first database instance.

18. The non-transitory machine-readable storage medium of claim 17, wherein the binary file comprises model parameters of the trained machine learning model.

19. The non-transitory machine-readable storage medium of claim 18, wherein the model parameters of the trained machine learning model comprise weights for a neural network model, coefficients for a linear regression model, or rules for a decision tree model.

20. The non-transitory machine-readable storage medium of claim 17, wherein the binary file comprises an identification of a machine learning algorithm.

* * * * *